Dec. 3, 1929. L. B. JONES ET AL 1,737,722
ELECTRICAL SYSTEM
Filed July 13, 1921
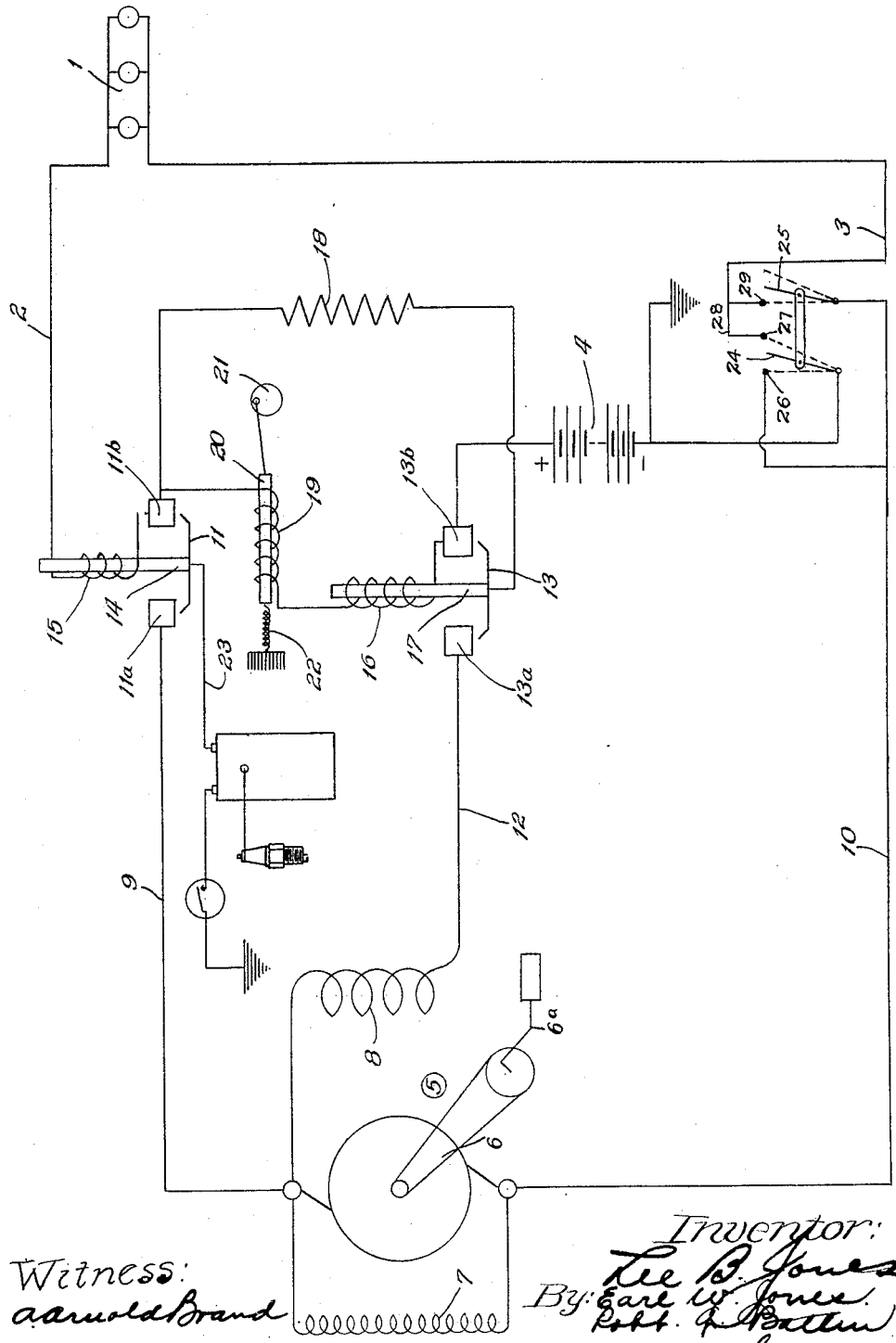

Patented Dec. 3, 1929

1,737,722

UNITED STATES PATENT OFFICE

LEE B. JONES, EARL W. JONES, AND ROBERT G. BATTIN, OF EVANSVILLE, INDIANA, ASSIGNORS TO SUNBEAM ELECTRIC MANUFACTURING COMPANY, OF EVANSVILLE, INDIANA, A CORPORATION OF INDIANA

ELECTRICAL SYSTEM

Application filed July 13, 1921. Serial No. 484,274.

Our invention relates to systems of distribution and it has especial relation to systems of the character described, which are known as load demand systems, wherein either a dynamo electric machine or a storage battery may be utilized to supply the load demand.

More particularly our invention relates to electrical systems which are known as isolated lighting and power systems wherein an independent source of supply supplies the load up to a predetermined point whereupon a dynamo electric machine is connected in circuit and loads in excess of such predetermined load supplied from said machine. While we will hereinafter describe our invention as embodied in such an isolated lighting system, it should be understood that the same may also be employed in other systems where a "load demand" operation is desired, such as in boats, automobiles, car lighting, etc.

In systems of the character described, the dynamo electric machine is driven by a prime mover, usually of the internal combustion type, and it is essential that means be provided in such systems whereby the generating unit, comprising the dynamo and the driving engine, are so associated that the dynamo functions as a motor to cause the starting of the internal combustion engine and is, thereafter, driven by the same as a generator to supply power to the line. It is moreover essential in systems fed by isolated power plants of the character above described, that the starting, stopping battery charging and intermediate regulating functions be entirely automatic, or as nearly so as possible.

One object of our invention, therefore, is to provide a system of the above indicated character wherein the load demand at any point on the system is instantly responded to by either a low capacity storage battery, or a higher capacity generating unit. In such a system the initial demand is usually supplied from the battery and, if said initial demand is in excess of a predetermined load, the generator unit is at once started to care for the same.

In our improved system we contemplate supplying all initial loads of less than a predetermined demand from a battery aggregate. Loads in excess of said predetermined quantity are supplied by the generating unit and, moreover, all loads which are within the capacity of the generating unit and are imposed upon the system after the dynamo electric machine is initially started are supplied by the generator alone. We believe that such a system, wherein the battery is called upon to carry a relatively small load only and to thereafter be completely relieved of its burden when the engine has started, is entirely novel. It should be mentioned, however, that, should an excessive overload be imposed on the system, the battery may assist the generator by parallel operation with the same.

The demands which are made upon the battery aggregate by a system which operates in accordance with our invention are radically less severe than would be the case if the battery were called upon to assume all of the load. The arrangement whereby the generator carries all loads after it has once been started results in a greatly increased battery life and, moreover, it is possible to provide a battery aggregate whose capacity is somewhat less than has been usually employed in the systems of the prior art.

Another object of our invention is to provide means whereby, upon a load demand exceeding that which is within the battery capacity, said battery is connected with the dynamo of the generating unit in such manner that a series field winding of said dynamo is energized. Such energization results in the starting of the dynamo as a practically series motor, whereby all the advantageous characteristics which are inherent in a series motor are utilized at the time of starting. It will be observed in the hereinafter described system that we have illustrated a compound wound machine, but on starting, the series characteristic so far overshadows the shunt field effect that the starting torque is essentially series in character. While it is very beneficial to start the electric machine as a series wound motor we desire the same to operate as a shunt wound generator and we, therefore, provide means whereby, when said machine attains a predetermined voltage, the series field is automatically disconnected from the battery and the machine thereafter operates as a shunt wound generator.

In our improved system we furthermore provide governing devices which are entirely automatic in character and which function to effect a number of desirable regulating operations. In the first place, the governing device which we provide is so associated with the fuel supply of the prime mover which drives the electric machine as a generator that only a sufficient amount of fuel is fed to said prime mover to cause it to operate satisfactorily. At the same time, said governing device operates to regulate the fuel supply in accordance with the battery charging current. The device under consideration comprises a throttle opening and closing mechanism whereby the fuel supply is governed directly and whence many advantageous features accrue to this governing device.

In addition, the above described device is so associated in the electrical system with the batteries and the load circuits that the electromotive force of the generator is always maintained at the correct value to supply the load required and, at the same time, to cause a charging current of a predetermined value to flow to the storage battery. In other words, irrespective of the load demand, which said device automatically responds to, the charging current of the batteries is so regulated that it does not exceed a predetermined amount and overcharging the sensitive cells of the battery.

Finally, we provide means whereby the prime mover may be easily started and utilized to carry a mechanical load. This comprises a manually operated control mechanism which closes the same switch as is closed upon a load demand, and thereby causes the dynamo to function as a motor to start the internal combustion engine. After the latter has come up to speed the dynamo is not, of course, called upon to furnish any electrical load although, within the capacity of the machine, both an electrical and mechanical load may be carried. During the time that only a mechanical load is carried, however, the above described control device functions as before to maintain the proper charging current whereby the batteries can never be charged at an excessive rate. The governing device, therefore, performs a plurality of desirable regulatory acts; it governs the charging current passing through the storage batteries, which in turn determines the speed of the prime mover and, as above pointed out, is responsive, in a desirable manner, whether the load be mechanical or electrical.

In the system hereafter described, additional advantages are secured because only series coils are utilized in the various governing and regulating devices. The employment of series coils eliminates the difficulties and the adjustments resulting from temperature changes which are required when shunt coils are used, as has heretofore been usual. Moreover, very short wires may be used in said coils and this and other series coil features greatly decrease the cost of production of the same whereby the cost of the system, as a whole, is lessened.

For a better understanding of our invention, reference may be had to the accompanying drawing, the single figure of which illustrates, diagrammatically, a system embodying our invention.

A load, represented at 1, is connected through various control instrumentalities and leads 2 and 3 to an independent source of supply represented as a storage battery 4. A generator 5 comprising an armature member 6, a shunt field winding 7 and a series field winding 8 is likewise adapted to be connected to the load 1 through leads 9 and 10 upon the actuation of a switch 11, the latter serving to connect the lead 9 to the lead 2. A prime mover or internal combustion engine 6$^a$ drives the armature 6 as shown; while a belt connection is indicated, it is understood that the dynamo and prime mover may be direct-connected, if desired.

The series field winding 8 is adapted to be connected through a lead 12 to the positive side of the storage battery 4 upon the closure of a switch 13. As illustrated, the storage battery 4 is continually in circuit with the load circuits 2 and 3.

The switch 11 comprises an armature controlled contact member 14 which bridges the contacts 11$^a$ and 11$^b$ and which is actuated by the magnetomotive force set up by a coil 15 which is connected in series with the load circuits, as shown. Also connected in series with the battery and load circuits is a coil 16 which sets up a magnetomotive force controlling the movement of an armature operated bridging member 17 of the switch 13, said bridging member being adapted to connect the contacts 13$^a$ and 13$^b$. A low resistance circuit 18 serves to connect the contacts 13$^b$ and 11$^b$ when the switch 13 is closed, for purpose to be hereinafter described.

A coil 19 is series connected with the battery 4 and the load 1 to control the movements of an armature 20 which is in turn associated with a throttle valve 21 disposed in the fuel supply circuit of the prime mover 6$^a$ which serves to drive the machine 5 as a generator. A spring 22 serves to constantly bias the armature 20 in such a direction that the throttle valve is maintained in full open position when the magneto motive force of the coil 19 does not exceed the force of the spring and tend to close said valve.

A shunt circuit 18, having resistance therein, extends from blade 13 to contact 11$^b$ for purposes hereinafter described. It will be noted that this circuit 18 forms a shunt around both coils 16 and 19 when armature 17 is in its upper position.

Upon the closure of the switch 11, an ignition circuit 23, having therein the requisite elements for properly controlling the ignition of the prime mover, is connected to the battery 4, it being observed that both the end of the circuit 23 and the negative side of the battery 4 are grounded.

Having described a diagrammatic system embodying the essential parts of my invention, the mode of operation is as follows:

Assuming, for illustration only, that the battery capacity is such that an initial load of less than 150 watts may be supplied therefrom, the circuit which exists upon the impression of an initial load of less than 150 watts or the predetermined quantity above referred to on the system is as follows:

From load 1 through lead 2, coil 15, contact 11$^b$, coil 19, coil 16, contact 13$^b$, battery 4, lead 3 and back to the load. Although the magnetomotive force which is set up by the current which flows to any load of less than 150 watts is insufficient to raise either the armature 14 or armature 17, these last named elements are immediately moved when the load exceeds the aforementioned demand. (It will be understood, of course, that should the initial demand be in excess of 150 watts, the system is immediately and automatically so connected that the same circuits prevail as are occasioned if the load demand increases after an initial demand less than 150 watts.)

When said load does exceed 150 watts, the current fed through coil 15 is sufficient to raise the contactor or switch 11, whereupon a circuit is established through 11$^b$, 11, 11$^a$, 9, armature 6, 10, and the battery. The current rush occasioned by the connection of the armature 6 to the battery, combined with load current which said battery is, at this instant, supplying, is sufficient to raise the switch 13 and thereby connect the battery to the series winding 8 through 13$^b$, 13, 13$^a$, and 12. At the same time current flows from the positive side of the battery through the contact 13$^b$, the coil 16, the coil 19, contact 11$^b$, switch 11, contact 11$^a$, lead 9 to the armature 6 of the generator and back through lead 10 of the battery. It will be apparent, therefore, that the current is supplied through a plurality of paths from the battery to the generator and that, inasmuch as the series characteristics predominate upon starting, the electrical machine 5 will be started as a series of motor and will serve, therefore, to very readily rotate or crank the prime mover of the internal combustion type which is mechanically connected thereto. At the same time it will be observed that the ignition circuit is completed by the connection of the switch member 14 to the contact 11$^b$.

As soon as the machine 5 comes up to speed by reason of its being driven by the prime mover, the voltage in the series field is built-up in a direction opposite to that caused by the initial supply of current thereto from the battery. At the same time, the voltage of the machine acting as a generator becomes sufficient to assume the entire load demand whereupon the load is supplied directly from said generator to the load 1 and, as we will presently describe, this voltage is maintained at a slightly greater value than the battery voltage whereby a current flows in an opposite direction through the battery circuit and the batteries are charged. When the current begins to flow in the opposite direction therethrough, by reason of the generator voltage exceeding the battery voltage, the magnetomotive force is reduced to zero at the time the current in the coil 16 is zero, whereupon the armature 17 drops and the series field of the machine is disconnected from the battery, as is desirable during subsequent operation of the system when the load is entirely carried by the generator. The charging current which passes through the switch is not sufficient to raise the armature 17.

As we have above pointed out the spring 22 so biases the armature 20 that the throttle tends to remain at full open position. However, this device is so adjusted that when the machine is operating to supply the load the force exerted by the coil tends to somewhat close the throttle. During the normal operation, that is, when the machine is supplying the load, just enough charging current flows through the battery circuit to satisfactorily charge the batteries. When an increased load draws more current there is a momentary decrease in the current supplied to the batteries and, therefore, the throttle tends to open by reason of the decreased pull of the armature caused by the decreased current which tends to flow to the batteries. This action, in turn, results in such operation of the controller that the proper relation is maintained between the generator and the battery to cause the correct charging current to flow to the battery.

Another way of stating this feature of our invention is to say that the controller 19 is so constructed that it regulates the amount of current flowing to the battery 7 to such an amount that the energy developed in coil 16 will not be sufficient to raise the switch 13. As a practical illustration of this it may be said that the controller regulates the charging rate of the battery at approximately 5 amperes. At the instant the switch 11 makes contact and the dynamo draws current from the battery, as above described, the amount of current flowing out of the battery is about 40 amperes. It is this 40 ampere rush of current through the coil 16 which raises switch 13 although thereafter and on account of the more efficient starting characteristics of the series wound motor, the battery is called upon to furnish about 10 to 12 amperes only while said dynamo is cranking the engine.

Again, if an increased load is imposed upon the system the current drawn thereby will cause the speed of the generator to decrease slightly, a well known characteristic of shunt wound machines. The voltage between the leads 9 and 10 will, therefore, decrease and a consequent decreased current will flow through the coil 19 to the battery 4 whereupon the biasing action of the spring will open the throttle widely and furnish more fuel to the prime mover driving the generator. The latter will then speed up and generate a sufficient voltage to take care of the increased load. The reverse action will, on a decreased load, of course, also be true.

As illustrated, therefore, the control element not only regulates the charging current of the battery but at the same time is so responsive to the load changes of the system, after the engine has once been started, that changes in load are automatically taken care of. Moreover, it should be noted that the governor acts directly upon the fuel supply, to the prime mover, a feature which is contributory to many of the advantages which are secured by the use of my improved system.

As we have above intimated, the switch 11 is of such character, by means of a construction well known in the art, that although a considerable magneto-motive force is required to close said switch it is kept in closed position by considerable less energy. These factors are so adjusted that although said switch does not close and place the generator in circuit with the load until after a predetermined load point has been reached, it remains in a closed position until no power at all is demanded of the system. In other words, after the engine has once assumed the load it continues to carry the same irrespective of how low the demand becomes, but, of course, can be so adjusted that switch 11 will open when a minimum of any predetermined amount of current is reached. This adjustment is accomplished by varying the relative position of blade 11 with respect to contacts 11ª and 11ᵇ as with a screw or otherwise.

When the load demand ceases entirely the coil 15, of course, drops its armature thereby opening the switch and breaking the ignition circuit of the prime mover whereupon the engine stops. When an initial load demand is again made on the system the above cycle of operations, or a portion thereof, is repeated.

In the above description of the operation of the system, we have omitted to point out the manner in which the shunt circuit 18 functions therein to contribute, in a marked degree, to the efficient operation thereof, preferring to describe the function of this shunt as follows:

Assume that a device drawing a current considerably in excess of the normal battery charging current—probably two or three times as much—is initially connected in circuit. When this situation obtains the coil 19 would have a current flowing therethrough of three times the amount necessary to cause it to overcome the pressure of spring 22 and therefore the throttle 21 would be pulled closed. Due to the fact that the throttle 21 would be closed, it would, therefore, be impossible for the engine to supply the necessary amount of current to the device.

The governor would not, therefore, function in the manner hereinafter described and for this reason we provide the shunt 18.

The abnormally large current we have just mentioned going through coil 19 will also pass through coil 16 and will generate sufficient magneto-motive force to raise plunger 17 thereby causing switch 13 to complete a circuit between contacts 13ᵇ and 13ª, whereby shunt 18 is connected so that current may pass from contact 13ᵇ to contact 11ᵇ and around coils 16 and 19.

We then have parallel current paths from 13ᵇ to 11ᵇ, through coils 16 and 19 and another through switch blade 13 and resistance shunt 18. It will be remembered that the electrical characteristics of the switch which is energized by coil 16 are such that it requires a far greater amount of energy in coil 16 to raise plunger 17 than it does to hold plunger 17 after switch blade 13 has made contact with switch contacts 13ᵇ and 13ª. It is, therefore, apparent that, although we by-pass, through shunt 18, a considerable quantity of the current around the coils 16 and 19, said coil 16 will still exert sufficient force to hold switch blade 13 in contact with switch contacts 13ᵇ and 13ª. However, since the current in coils 16 and 19 is greatly reduced in amount, coil 19 will no longer exert sufficient force to overcome spring 22 with the result that throttle 21 will go to a wide open position. The engine is, therefore, able to pull the relatively large load which has been imposed thereupon at point 1.

With the full power of the engine available, the generator 6 will soon come up to battery voltage, which will in turn, cause a reversal of the direction of current flow in the coils 19 and 16, the current in the coils building up to some value equal to, or less than, the normal charging rate of the battery. During this reversal of current in coil 16 its energy will pass through zero whereupon the plunger 17 will fall, allowing switch blade 13 to fall from electrical contact with contacts 13ᵇ and 13ᵃ which disconnects shunt 18 from around coils 16 and 19. The circuits are then in normal condition to admit of the proper functioning of the fuel controlling throttle as the load changes.

The function of shunt 18 therefore is to prevent the sudden application of a very large load from causing the engine to fail to generate the correct amount of power to take care of the situation. It is apparent that, if the engine be running and the switch blade 13 come into contact with switch contacts 13ᵇ and 13ᵃ from any cause, the throttle may go to a wide open position whereby the engine is capable of generating such an amount of power that the apparatus will assume normal working condition in a few seconds.

In this manner we reconcile the apparently contradictory fact that the coil 19 pulls against spring 22, because by shunting the heavy current around the coil at the starting of the engine, as above described, we insure that the throttle will be wide open and that therefore the engine will be amply supplied with fuel at the very time it needs the same. On the other hand the disconnection of the shunt circuit after the engine has started allows the coil 19 to govern the throttle in accordance with load changes as hereinbefore described.

If it is desired to start the engine and cause the same to drive a mechanical load, although no electrical load is imposed thereupon, the switch 11 may be raised to connect the contacts 11ᵃ and 11ᵇ, whereupon the dynamo running as a motor, cranks the engine as above indicated. It should be observed, moreover, that the system is so laid out that both the electrical and the mechanical load may be imposed thereon, at the same time, if desired.

The means whereby the switch 11 is manually operated to perform the functions just described, when only a mechanical load is imposed on the system, are illustrated in a co-pending application of ours, Serial No. 478,665, filed June 18, 1921, and assigned to the Sunbeam Electric Manufacturing Company. Of course, we regard the present diagrammatic illustration as entirely sufficient with respect to disclosure of this manually-operated switch, since the armature 14 may be raised by hand whereby contacts 11ᵃ and 11ᵇ are connected and the engine started. In the system illustrated we have shown two switches, one, 25, in the main circuit and another, 24, in the battery circuit, which may be opened for particular purposes.

Ordinarily switch 24 is mounted on the control box and is interlocked with switch 25, both of these switches being single throw and being so interlocked that they open and close together whereby one circuit cannot be broken without breaking the other. There may be cases, however, where it is desirable to change the plant from an automatic plant to a non-automatic plant for certain periods of time and it is desirable to have necessary means provided whereby such change between these two types of plants can be accomplished quickly and without skill on the part of the owner. In order to provide for such a change in the system, we arrange a further switch point as follows:

By making switch 24 double throw between contacts 26 and 27 and connecting a lead 28 from the latter to the main 3 we provide a path for the current to flow from switch blade 24, through contact 27, and lead 28 to lead 3 and it will be noted that, because switch 25 has only one switch contact and that switches 24 and 25 are interlocked together, while switch blade 24 makes contact with switch contact 27, blade 25 will be open whereby lead 10 will be open circuited at said switch 25. Of course, by the extension of the necessary wires this switch assembly, consisting of blades 24 and 25, and contacts 26, 27 and 29, can be mounted at any convenient place about the premises, thereby making it unnecessary for the owner of the plant to go to the plant to throw this switch and accomplish its function above described.

With respect to the operation of this last-described system, let us assume that it is desirable to make the automatic feature of the plant non-operative, that is, it is desired to draw current in any amount from the battery without causing the engine to start. The interlocked switch consisting of blades 24 and 25 is placed in such a position that blade 24 is in contact with contact 27 at which time blade 25 is entirely open. Starting at the load 1 we would have a circuit through lead 3, lead 28, contact 27, switch blade 24, through battery 4, contact 13, coil 16, coil 19, contact 11ᵇ, coil 15, lead 2, and back to load 1. In view of the fact that lead 10 is open at switch blade 25, under the conditions just recited, it is immaterial as to whether armatures 14 or 17 raise. If they do, the only result is that an electro-motive-force is imposed on the generator 5, but no current can flow because the lead 10 is not connected to the battery.

Again, with the switch 11 in contact with the switch contacts 11ᵇ and 11ᵃ the lead 23 is energized, but because the point of ignition occurs in the engine near the highest point of compression, the engine will not stop of its own accord in such a position that the timer contacts make a circuit. Therefore, even though the spark coil is energized through lead 23, no current flows through this coil to the ground.

It will further be noted that, if a rather large amount of current is required for load 1 and coils 15 and 16 become sufficiently energized to lift plungers 14 and 17, a path for flow of current which is of even lower resistance, that is shunt 18, is placed in circuit. This would enable heavy loads to be drawn from the battery without all of this current passing through coils 16 and 19, which we consider to be a feature of considerable advantage.

From the above description it will be noted that we have provided a system of distribution for use with isolated, self-contained power plants, wherein are positioned a number of desirable regulating devices which function to provide, in a simple and easily understood manner, an entirely automatic operation of the system.

The user of an electrical system embodying our invention is relieved entirely of exercising supervision over the same since it starts upon demand and stops when said demand ceases. Between these two extremes all of the necessary regulatory operations are performed automatically.

Because of the above described features which, as we have intimated, admit of the use of a lower capacity battery aggregate, the first cost as well as the subsequent upkeep of a system embodying our invention is considerably reduced.

While we have described but one embodiment of our invention, it is obvious that many modifications therein may occur to those skilled in the art and we desire, therefore, that the same be limited only by the appended claims and by the showing of the prior art.

Having thus described our invention what we now claim as new and desire to secure by Letters Patent is:

1. In a system of electrical distribution, a generating unit including a prime mover and a dynamo electric machine, an independent source of supply, means responsive to the load drawn from said system to connect said dynamo electric machine to said load and said independent source, means for connecting said independent source to a series field of said dynamo electric machine to start the latter, means in series with said second means for controlling the fuel supply of said prime mover, and means for initially shunting said second- and third-named means when said series field is energized.

2. In a system of electrical distribution, a generating unit comprising a dynamo electric machine and prime mover, a storage battery, means comprising a switch-actuating coil for supplying a series field of said dynamo electric machine to start the same upon a predetermined load demand, means whereby said battery is charged with said dynamo electric machine is carrying the load, and means governing the speed of said dynamo electric machine and for so regulating the battery charging current that said first-named means is not actuated thereby, whereby said series winding is ineffective.

3. In a system of electrical distribution, a generating unit comprising a dynamo electric machine and prime mover, a storage battery, means comprising a switch-actuating coil for supplying a series field of said dynamo electric machine to start the same upon a predetermined load demand, means whereby said battery is charged when said dynamo electric machine is carrying the load, and means comprising a controller coil in series with said first-mentioned coil to govern the speed of said dynamo electric machine and to so regulate the battery charging current that said first-named means is not actuated thereby, whereby said series winding is ineffective.

4. In a system of electrical distribution, a generating unit comprising a prime mover and a dynamo electric machine, a battery aggregate, speed controlling means for said prime mover, governing means for said speed controlling means comprising a coil which normally acts to lower the speed of said prime mover as the current through said coil increases, and means whereby the normal tendency of said coil is nullified during the starting of said prime mover.

5. In a system of electrical distribution, a generating unit comprising a prime mover and a dynamo electric machine, a battery aggregate, speed controlling means for said prime mover, comprising a throttle, means for normally closing said throttle as the current flowing through said battery circuit increases, and means for nullifying the said normal tendency of said throttle closing means until said prime mover reaches a predetermined speed.

6. In a system of electrical distribution, a generating unit comprising a prime mover and a dynamo electric machine, a battery aggregate, speed controlling means for said prime mover, comprising a throttle, means for normally closing said throttle as the current flowing through said battery circuit increases, and means comprising a shunt circuit which is connected around said throttle closing means for nullifying the normal tendency thereof until said prime mover reaches a predetermined speed.

7. In a system of electrical distribution, a generating unit comprising a prime mover and a dynamo electric machine, a battery aggregate, speed controlling means for said prime mover, comprising a throttle, means for normally closing said throttle as the current flowing through said battery circuit increases, a shunt circuit adapted to be connected around said throttle closing means, and means for connecting said shunt around said means when the prime mover is started and for disconnecting said circuit when the prime mover attains a predetermined speed.

8. In a system of electrical distribution, a generating unit, an independent source of supply, a load circuit, automatic means whereby a load in excess of a certain figure causes said generating unit to supply said load, switching means for initially and simultaneously connecting said load circuit to said generator circuit and to said independent source of supply, and said independent source of supply to generator circuit, and means comprising auxiliary switch points to provide for the breaking of both of said connections and for connecting said independent source of supply to said load circuit only whereby said system is changed from an automatic to a nonautomatic system.

9. In a system of electrical distribution, a generating unit comprising a prime mover and a dynamo electric machine, a battery aggregate, speed controlling means for said prime mover comprising a throttle, means for regulating said throttle during the normal operation of said generating unit, and means for rendering said throttle regulating means inoperative during the starting period of said prime mover.

In witness whereof, we have hereunto subscribed our names.

LEE B. JONES.
EARL W. JONES.
ROBERT G. BATTIN.

CERTIFICATE OF CORRECTION.

Patent No. 1,737,722.            Granted December 3, 1929, to

LEE B. JONES ET AL.

It is hereby certified that error appears in the printed specification of the above numbered patent requiring correction as follows: Page 2, line 37, for the word "overcharging" read "overcharge"; page 6, line 56, claim 2, for the word "with" read "when"; and that the said Letters Patent should be read with these corrections therein that the same may conform to the record of the case in the Patent Office.

Signed and sealed this 28th day of January, A. D. 1930.

(Seal)

M. J. Moore,
Acting Commissioner of Patents.